United States Patent [19]

Akashi et al.

[11] Patent Number: 4,482,578
[45] Date of Patent: Nov. 13, 1984

[54] METHOD FOR PREPARING MAGNETIC RECORDING MEDIA

[75] Inventors: Goro Akashi; Tatsuji Kitamoto; Tsutomu Okita, all of Kanagawa, Japan

[73] Assignee: Fuji Photo Co., Ltd., Kanagawa, Japan

[21] Appl. No.: 505,509

[22] Filed: Jun. 17, 1983

[30] Foreign Application Priority Data

Jun. 17, 1982 [JP] Japan ................. 57-104133

[51] Int. Cl.$^3$ ............................................. B05D 3/06
[52] U.S. Cl. ........................................ 427/44; 427/48; 427/130
[58] Field of Search ............... 427/44, 54.1, 127, 128, 427/130, 47, 48

[56] References Cited

U.S. PATENT DOCUMENTS

| | | | |
|---|---|---|---|
| 3,117,065 | 1/1964 | Wootten | 427/48 |
| 4,343,831 | 8/1982 | Tsuji et al. | 427/44 |
| 4,407,853 | 10/1983 | Okita et al. | 427/44 |

*Primary Examiner*—John H. Newsome
*Attorney, Agent, or Firm*—Sughrue, Mion, Zinn, Macpeak & Seas

[57] ABSTRACT

A method for preparing a magnetic recording medium comprising a non-magnetic support having coated thereon a magnetic layer containing plate-shaped ferromagnetic fine particles oriented perpendicular to a plane of the surface of the support, the process comprising the steps of:

coating the non-magnetic support with a coating composition wherein ferromagnetic fine particles are dispersed in a solution comprised of a compound polymerizable by radiation with electron beams and a solvent, said particles being plate-shaped and having an axis of easy magnetization perpendicular to a plane of the plate-shaped particles;

orienting the ferromagnetic fine particles perpendicular to the surface of support while the coating composition is undried;

radiating the composition with electron beams; and drying the composition by removing the solvent.

19 Claims, No Drawings

METHOD FOR PREPARING MAGNETIC RECORDING MEDIA

FIELD OF THE INVENTION

This invention relates to a method for preparing a magnetic recording medium. More particularly, it relates to a method for preparing a magnetic recording medium for perpendicular magnetic recording having excellent orientation of ferromagnetic fine particles which comprises dispersing ferromagnetic fine particles in a binder and coating the resulting coating composition on a support.

BACKGROUND OF THE INVENTION

Due to the increased use of a magnetic recording medium with wide variation, it has become necessary to develop a magnetic recording medium having excellent characteristics in the short wavelength region. This requirement has increased with the demand for improving video tapes, audio tapes, tapes for computers or floppy discs.

Therefore, it is necessary that an axis of easy magnetization of ferromagnetic particles be perpendicular to a surface of a magnetic recording layer. Various studies were made for orienting acicular particles in a magnetic field perpendicular to a recording surface, as disclosed in U.S. Pat. No. 3,052,567. However, the orientation of the particles often tends to be disturbed during drying. Also, an attempt was made to orient plate-shaped particles such as Ba-ferrite type particles having an axis of easy magnetization perpendicular to the plate thereof instead of the acicular particles in a magnetic field perpendicular to a recording surface, but the orientation of the particles was also disturbed during a drying step.

That is, it was clear that the highly oriented ferromagnetic particles in a coated magnetic coating composition are disturbed during the drying step thereby deteriorating the excellent orientation.

SUMMARY OF THE INVENTION

This invention relates to a method for preparing a magnetic recording medium suitable for perpendicular magnetic recording using plate-shaped hexagonal ferrite particles such as the above-described Ba-ferrite type particles.

More particularly, the present invention relates to a method for preparing an extremely smooth coated layer having good orientation and high dispersibility of ferromagnetic particles, the method comprising dispersing plate-shaped particles having an axis of easy magnetization perpendicular to the plate thereof, in a solution containing a compound polymerizable by an electron beam and a solvent to prepare a coating composition, coating the resulting coating composition on a support, orienting the magnetic particles immediately after coating, polymerizing the coating composition in the presence of the solvent by electron beam radiation to prevent the magnetic particles from coagulating with each other and from disturbing the orientation, and drying the coated layer by evaporating the solvent.

DETAILED DESCRIPTION OF THE INVENTION

The present inventors have found that where the dispersion of the above-mentioned ferromagnetic particles are coated on a support, the ferromagnetic particles are subjected to orientation in a magnetic field perpendicular to the recorded surface and simultaneously or immediately the coated layer is radiated with electron beams, polymerization is very quickly carried out by electron beam radiation. Accordingly, the ferromagnetic particles can maintain good dispersibility and orientation after being coated on a support, by polymerizing with electron beam radiation all or a part of the binder to increase the viscosity of the coating composition. The polymerization prevents coagulation and disturbance of the orientation of ferromagnetic particles.

Compounds polymerizable by electron beam include those having one or more carbon-carbon unsaturated bonds such as acryloyl group, methacryloyl group, acrylamide group, allyl group, vinyl ether group or vinyl thioether group and unsaturated polyesters. The typical examples are unsaturated fatty acids such as acrylic acid, or 2-butenoic acid; unsaturated polybasic acids such as maleic acid, fumaric acid, 2-buten-1,4-dicarbonic acid or muconic acid; unsaturated fatty acid amides such as acrylamide, crotonamide, 2-penteneamide or maleinamide; alkyl acrylates such as methyl acrylate; styrenes such as α-methylstyrene or β-chlorostyrene; acrylonitrile, vinyl acetate or vinyl propionate. Two or more unsaturated bonds may be contained in one molecule of the compound. Examples of those compounds are disclosed in *Light-Sensitive Resin Data Collection*, pages 235 to 236 by Sogo Kagaku Kenkyusho, published on December 1968. Particularly preferred, compounds are unsaturated esters of polyol such as ethylene diacrylate, diethylene glycol diacrylate, glycerol triacrylate, ethylenediacrylate or pentaerythritol tetraacrylate and glycidyl acrylate having an epoxy ring. Most preferred compounds are diethylene glycol diacrylate, glycerol triacrylate and pentaerythritol tetraacrylate. A compound having one unsaturated bond in one molecule and a compound having two or more unsaturated bonds can be used in combination.

The compounds can be high molecular weight compounds. The most preferred compound is a compound having acrylate groups at both terminals of or in the side of the main polymer chain. The examples of the compounds are illustrated by A. Vrancken in *Fatipec Congress*, 11, 19 (1972) such as the following compound.

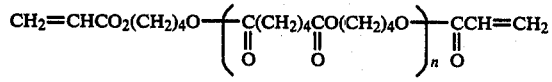

The polyester skeleton of the above compounds can be a polyurethane skeleton, an epoxy resin skeleton, a polyether skeleton, a polycarbonate skeleton or a mixture thereof. The molecular weight of the compounds are preferably 1,000 to 20,000 but should not be limited. The above-described monomers and polymers can be used in combination as a compound polymerizable by electron beam radiation. A preferred ratio of monomer to polymer is from about 5:95 to about 40:60 by weight, with the most preferred ratio being from 10:90 to 25:75 by weight.

Thermoplastic resins such as vinyl chloride-vinyl acetate copolymers, vinyl chloride-vinyl acetate-vinyl alcohol copolymers, vinyl chloride-vinyl acetate-maleic acid copolymers, vinyl chloride-vinyl propionate copolymers, cellulose resins such as nitrocellulose, acetyl butyl cellulose, acetal resin, vinyl chloridevinylidene chloride resin, urethane resins such as polyester type polyurethane resins and polyether type polyurethane resins, or acrylonitrile-butadiene copolymers can be used alone or in combination in a magnetic coating composition of the present invention, if necessary. These thermoplastic resins can be used at a proportion of about 10% to about 60% by weight based on the amount of solid components in the binder.

The compound polymerizable by electron beam radiation is present in the binder component (i.e., an organic substance of a magnetic coating composition excluding an organic solvent and additives) in an amount of about 3 wt % or more, preferably 8 wt % to 100 wt %. If the above compound is present in an amount below the above ratio, the viscosity of the coating composition increases upon radiation with an electron beam and gelation is so low that the oriented magnetic particles are insufficiently fixed. The total amount of the binder component (an organic substance of a magnetic coating composition excluding an organic solvent and additives) is preferably contained in a weight ratio of 0.1 to 7, more preferably 0.2 to 0.5, based on the weight of the magnetic particles.

Ferromagnetic particles used in the present invention are plate-shaped and the axis of easy magnetization is perpendicular to the surface of the plate. Specific examples of such particles include barium ferrite type ferromagnetic particles as disclosed in U.S. Pat. No. 4,341,648, and MnBi type ferromagnetic particles, which are hexagonal crystals. Regarding barium ferrite type particles, a portion of the Ba can be substituted with Sr, Pb or Ca and a portion of the Fe can be substituted with Co, Ni, Mn, Ti, V and/or Nb (preferably with Co+Ti or Co+Nb) to control the coercive force and to adjust the particle size. Regarding MnBi, a portion of the Bi can be substituted with Se or As. As to the size of ferromagnetic particles, the plate-shaped diameter is 1$\mu$ or less and preferably 0.3$\mu$ or less, and the thickness of the plate-shaped particles is preferably ⅓ of the diameter.

Useful organic solvents include ketones such as acetone, methyl ethyl ketone, methyl isobutyl ketone or cyclohexanone; esters such as methyl acetate, ethyl acetate, butyl acetate, ethyl lactate or monoethyl ether glycol acetate; glycol ethers such as ether, glycol dimethyl ether, glycol monoethyl ether or dioxane; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene. Preferred examples of organic solvents are methyl ethyl ketone, cyclohexanone, tetrahydrofuran, ethyl acetate, butyl acetate, toluene and xylene. These organic solvents can be used in an amount of about 600 to about 1,500 parts by weight, preferably 700 to 1,200 parts by weight, per 100 parts by weight of solid components in the binder Additives such as lubricants, abrasives, anticorrosion agents or antistatic agents such as carbon black or a graphite can be added to the magnetic coating composition of the present invention. Useful lubricants include saturated or unsaturated higher fatty acids such as oleic acid, linolic acid and the like, fatty acid esters such as hexyl laurate, butyl laurate, ethyl palmitate, isopropyl myristate, butyl stearate and the like, higher fatty acid amides such as palmitic acid amide, stearic acid amide and the like, higher alcohols, each having 10 to 25 carbon atoms, silicone oils, mineral oils, edible oils or fluoride type compounds. These additives can be added to the magnetic coating composition in an amount of about 1 to about 5 parts by weight per 100 parts by weight of the binder. These additives can be added when a coating composition is prepared, or can be coated or sprayed on a surface of a magnetic layer with or without an organic solvent, after drying and smoothening the magnetic layer.

Ferromagnetic particles and the above-described compounds are simultaneously or separately charged into a mixing device where a coating composition is prepared. A dispersing agent can be preliminarily dispersed with the ferromagnetic particles which are then combined with a compound polymerizable with electron beam radiation and thermoplastic resins.

Various mixing kneading devices for mixing and kneading the composition of the invention can be used such as a two-roll mill, a ball mill, a sand grinder, a Disper, a high speed impeller dispersing device, a high speed mixer or a homogenizer. Useful methods for coating the magnetic coating composition on a support include doctor coating, blade coating, air knife coating, squeeze coating, reverse roll coating and gravure coating.

The dry thickness of the magnetic layer is about 0.5 to 15 $\mu$m and is determined by factors such as the intended use, and the shape generally used for such a magnetic recording medium.

Orientation of the ferromagnetic particles are carried out under the following conditions. A direct current or alternating magnetic field of 1,000 to 10,000 Gauss, preferably a direct current magnetic field of 1,500 to 5,000 Oe, can be used. The direction of orientation of ferromagnetic particles is perpendicular or nearly perpendicular to the recorded surface for magnetic perpendicular recording. Where acicular particles are subjected to orientation in a horizontal direction and coated on a support, the perpendicular magnetic recording layer of the present invention can be provided thereon. Such combination is useful in a magnetic recording-reproducing system using a ring head in which the sensitivity of high density recording portion is increased by an upper perpendicular magnetic layer and the sensitivity of low density recording portion is increased by a lower layer.

Useful methods of orientation include methods which make use of a permanent magnet, a solenoid coil or an electric magnet where it is possible to use a magnetic field having its direction perpendicular to the recording surface.

A van de Graaff type scanning method, a double scanning method, a curtain beam method or a beam curtain method can be applied to accelerate the electron beam. A beam curtain method is relatively economical and can produce a high output. The electron beam is characterized by an accelerating voltage of 100 to 1,000 kv, preferably 150 to 400 kv, and an absorption dose of 0.5 to 20 megarads, preferably 2 to 10 megarads. Where the accelerating voltage is not more than 100 kv, the transmitted amount of energy is short. Where the accelerating voltage is more than 1,000 kv, the energy efficiency used for polymerization is lowered and is uneconomical. Where the absorption dose is not more than 0.5 megarad, the curing reaction is insufficient to obtain a strong magnetic layer. Where the absorption dose is not lower than 20 megarads, the energy efficiency used for the curing reaction is lowered or a radiated object generates heat and a plastic support deforms.

The orientation steps for the ferromagnetic particles and the electron beam radiation should be finished before the solvent has completely evaporated and while the coating composition remains fluid. However, it is preferred that orientation and electron beam radiation are carried out simultaneously or that the electron beam radiation is carried out immediately after orientation, for example, within about 5 seconds, preferably within 3 seconds, after the orientation.

The temperature for drying the magnetic layer with hot air is in the range of about 50° to 120° C., preferably 70° to 100° C. and more preferably 80° to 90° C. The time required for drying varies widely depending upon the temperature of hot air used for drying and is not limitative, but is generally about 10 to about 30 seconds.

A smoothing treatment with a calender roll which is used for preparing a conventional magnetic recording medium can be used in the present invention, if necessary.

A calendering treatment with mirror surface rolls or with a mirror surface roll and an elastic roll can be applied to smooth a surface of the magnetic layer. A metal roll is useful as the mirror surface roll and the elastic roll may be a cotton roll or a synthetic resin (nylon or polyurethane) roll.

After the magnetic layer which is obtained by coating the coating composition of the invention on the support is subjected to smoothing treatment with the above-described rolls, an electron beam can be further radiated on the magnetic layer as the final curing treatment. The radiation with an electron beam for final curing treatment can be effected under substantially the same conditions as those described previously, until the curing reaction is completed.

In the present invention, the smoothing treatment with a mirror surface roll is carried out after an organic solvent is removed from the coating layer coated on a support. In this case, all of the organic solvent or a part of the organic solvent may be removed. For example, the smoothing treatment can be carried out after the coating layer is allowed to stand or dried under a normal condition to remove all or a part of an organic solvent.

Materials for the support include polyesters such as polyethylene terephthalate or polyethylene-2,6-naphthalate; polyolefins such as polyethylene or polypropylene; cellulose derivatives such as cellulose triacetate; plastics such as polycarbonate, polyimide or polyamide imide; non-magnetic metals such as aluminum, copper, tin, zinc or non-magnetic alloys including the above metals, and a kind of paper or a paper coated or laminated with polyolefins. Preferred examples of supports are polyethylene terephthalate, polyethylene-2,6-naphthalate or polyimide film.

The non-magnetic support may be in the form of a film, a tape, a sheet, a disc, a card or a drum and various materials can be selected depending upon the above shape.

A backcoat can be provided on the support on the side opposite to the magnetic layer for the purposes of preventing electrostatic charge, print-through, wow flutter, improving the strength of the magnetic recording medium and making the back side of the support matted layer. Such backcoat can be provided by known methods such as those described in U.S. Pat. Nos. 4,135,031, 4,310,599, etc.

Additives as disclosed in Japanese Patent Publication No. 26890/81 can be incorporated into the magnetic layer of the present invention.

In accordance with the invention, high orientation and squareness ratios can be obtained by the method which comprises using plate-shaped particles such as Ba ferrite or Sr ferrite type having an axis of easy magnetization perpendicular to the plate and a binder which is curable by electron beam radiation, providing orientation in a perpendicular magnetic field after coating the coating composition and, at the same time or immediately after orientation, radiating the composition with electron beams.

The present invention is further illustrated in more detail by the following examples and comparative examples. However, the scope of the invention is not limited to these examples. In the examples and comparative examples, all parts are by weight.

EXAMPLE 1

| | parts |
|---|---|
| Co-modified Ba ferrite | 100 |
| Particle diameter: 0.08μ | |
| Thickness: 0.025μ | |
| Coercive force: 810 Oe | |
| Nitrocellulose ("RS1/2H" manufactured by Daicel Chemical Industries, Ltd.) | 5 |
| Urethane resin (condensation product of adipic acid/butane diol/tolyrene diisocyanate) | 5 |
| Acrylic acid | 0.5 |
| Ester acrylate oligomer ("Aronics M6300" manufactured by Toa Gosei Co., Ltd.) | 12 |
| Hexamethylene diacrylate | 3 |
| Methyl ethyl ketone | 250 |
| Stearic acid | 1 |
| Butyl stearate | 1 |

The above composition was kneaded with a ball mill for 50 hours to obtain a magnetic coating composition, which was then coated by a doctor blade in a dry thickness of 8μ on a polyethylene terephthalate support having a thickness of 20μ. The coated layer was subjected to orientation perpendicular to the surface of the support by passing the medium between a pair of a cobalt-rare earth metal alloy magnet (5,000 G) facing opposite poles and within 1 minute an electron beam with an accelerating voltage of 3,000 kv and a beam current of 5 mA was radiated so that the absorption dose was 5 Mrad. The solvent was evaporated at 100° C. for 1 minute. Then, the medium was wound, subjected to a smoothing treatment with seven calender rolls at 80° C. and 150 kg/cm of a linear pressure and slit to a width of ½ inch to prepare a magnetic recording tape.

COMPARATIVE EXAMPLE 1

The same procedure as in Example 1 was repeated except that electron beam radiation was carried out after the solvent was evaporated.

| | parts |
|---|---|
| Co-modified Ba ferrite | 100 |
| Particle diameter: 0.1μ | |
| Thickness: 0.025μ | |
| Coercive force: 800 Oe | |
| Polyester type urethane acrylate oligomer ("Aronics M110012" manufactured by | 20 |

-continued

|  | parts |
|---|---|
| Toa Gosei Co., Ltd.) |  |
| Acrylic acid | 2 |
| Methyl ethyl ketone | 150 |
| Stearic acid | 1 |
| Butyl stearate | 1 |

The same procedure as in Example 1 was repeated except that the above-described coating composition was used.

COMPARATIVE EXAMPLE 2

The same procedure as described in Example 2 was repeated except that the electron beam radiation was conducted after the solvent was evaporated. The squareness ratio (residual flux density/maximum flux density) of the thus obtained sample was determined and the results obtained are shown in Table 1 below. The sample was then slit into a width of ½ inch. Video signals at 4 MHz were recorded using the resulting tape by a VHS type video tape recorder and were compared with a playback output, with reference to the output in Comparative Example 1 as 0 dB.

TABLE 1

| Example or Comparative Example | Squareness Ratio | Video Output (4 MHz) |
|---|---|---|
| Example 1 | 0.84 | +3 dB |
| Comparative Example 1 | 0.66 | 0 dB |
| Example 2 | 0.83 | +2.5 dB |
| Comparative Example 2 | 0.69 | +0.5 dB |

COMPARATIVE EXAMPLE 3

The same procedure of perpendicular orientation and subsequent electron beam radiation as described in Example 1 was repeated except that the ferromagnetic particles in Example 2 were replaced by acicular Co-modified $\gamma$-Fe$_2$O$_3$ (particle length: 0.3$\mu$, particle width: 0.04$\mu$, coercive force 810 Oe). The resulting tape was tested according to the procedure as described in Comparative Example 2 and the results obtained are shown in Table 2 below.

COMPARATIVE EXAMPLE 4

The same procedure as described in Comparative Example 3 was repeated except that the electron beam radiation was conducted after the solvent was evaporated. The resulting tape was tested according to the procedure as described in Comparative Example 2 and the results obtained are shown in Table 2 below.

TABLE 2

| Comparative Example | Squareness Ratio | Video Output (4 MHz) |
|---|---|---|
| Comparative Example 3 | 0.73 | −1.0 dB |
| Comparative Example 4 | 0.61 | −3.0 dB |

It is apparent from the results shown in Table 2 that, even though the acicular particles are subjected to perpendicular orientation and electron beam radiation, the squareness ratios thereof, i.e., orientation, are markedly inferior to those of the plate-shaped hexagonal crystalline particles of the present invention.

While the invention has been described in detail and with reference to specific embodiments thereof, it will be apparent to one skilled in the art that various changes and modifications can be made therein without departing from the spirit and scope thereof.

What is claimed:

1. A method for preparing a magnetic recording medium comprising a non-magnetic support having coated thereon a magnetic layer containing plate-shaped ferromagnetic fine particles having the axis of easy magnetization thereof oriented perpendicular to a plane of the surface of the support, the process comprising the steps of:

coating the non-magnetic support with a coating composition wherein ferromagnetic fine particles are dispersed in a solution comprised of a compound polymerizable by radiation with electron beams and a solvent, said particles being plate-shaped and having an axis of easy magnetization perpendicular to a plate of the plate-shaped particles;

orienting the axis of easy magnetization of the ferromagnetic fine particles perpendicular to the surface of support while the coating composition is undried;

radiating the composition with electron beams; and drying the composition by removing the solvent.

2. A method for preparing a magnetic recording medium as claimed in claim 1, wherein the compound polymerizable by an electron beam is a compound selected from the group consisting of ethylene diacrylate, diethylene glycol diacrylate, glycerol triacrylate, ethylene diacrylate, pentaerythritol tetraacrylate and glycidyl acrylate having an epoxy ring.

3. A method for preparing a magnetic recording medium as claimed in claim 1, wherein the compound polymerizable by radiation with an electron beam is a compound selected from the group consisting of a polyurethane skeleton, an epoxy resin skeleton, a polyether skeleton, a polycarbonate skeleton and mixtures thereof, said compound having a molecular weight in the range of 1,000 to 20,000.

4. A method for preparing a magnetic recording medium as claimed in claim 3, wherein said compound has a polyurethane skeleton, a polyester skeleton or a polycarbonate skeleton and has acryloyl groups at both terminals having a molecular weight in the range of 1,000 to 20,000.

5. A method for preparing a magnetic recording medium as claimed in claim 1, wherein the compound polymerizable by an electron beam is present in the solution in an amount of 3 wt % or more based on the weight of the solution without the solvent.

6. A method for preparing a magnetic recording medium as claimed in claim 5, wherein the compound polymerizable by an electron beam is present in the solution in an amount of 8 wt % or more based on the weight of the solution without solvent.

7. A method for preparing a magnetic recording medium as claimed in claim 1, wherein the solution, without the solvent, is present in a weight ratio of 0.1 to 7 based on the weight of the ferromagnetic fine particles.

8. A method for preparing a magnetic recording medium as claimed in claim 7, wherein the solution, without the solvent, is present in a weight ratio of 0.2 to 0.5 based on the weight of the ferromagnetic fine particles.

9. A method for preparing a magnetic recording medium as claimed in claim 1, wherein the ferromagnetic fine particles are selected from the group consisting of barium ferrite type ferromagnetic particles and MnBi type ferromagnetic particles having a hexagonal crystal shape.

10. A method for preparing a magnetic recording medium as claimed in claim 9, wherein the Ba portion of the barium ferrite type particles can be substituted with Sr, Pb and Ca and further wherein the Fe can be substituted with Co, Ni, Mn, Ti, B and Nb in order to control the coercive force and adjust the particle size.

11. A method for preparing a magnetic recording medium as claimed in claim 9, wherein the Bi portion of the MnBi type ferromagnetic particles can be substituted with Se or As.

12. A method for preparing a magnetic recording medium as claimed in claim 9, wherein the plate-shaped particles have a diameter of $1\mu$ or less.

13. A method for preparing a magnetic recording medium as claimed in claim 1, wherein the coating composition forms a magnetic layer after drying having a thickness in the range of about 0.5 to 15 $\mu$m.

14. A method for preparing a magnetic recording medium as claimed in claim 1, wherein the orienting is carried out using a direct current magnetic field of 1,000 to 10,000 Gauss.

15. A method for preparing a magnetic recording medium as claimed in claim 1, wherein the orienting is carried out using an alternating magnetic field of 1,000 to 10,000 Gauss.

16. A method for preparing a magnetic recording medium as claimed in claim 1, wherein the radiating is carried out using an electron beam having an accelerating voltage in the range of 100 to 1,000 kv and providing an absorption dose of 0.5 to 20 megarads.

17. A method for preparing a magnetic recording medium as claimed in claim 16, wherein the radiating is carried out using an electron beam having an accelerating voltage in the range of 150 to 400 kv and providing an absorption dose in the range of 2 to 10 megarads.

18. A method for preparing a magnetic recording medium as claimed in claim 1, wherein the drying is carried out at a temperature in the range of about 50° to 120°.

19. A method for preparing a magnetic recording medium as claimed in claim 1, wherein the orientation of the ferromagnetic fine particles is effected using a permanent magnet, a solenoid coil or an electric magnet, whose magnetic field has its direction perpendicular to the magnetic layer.

* * * * *